(No Model.)

C. SCOTT.
CAR SPRING.

No. 245,665. Patented Aug. 16, 1881.

WITNESSES:

INVENTOR,
Chas. Scott,
By Connolly Bros.
ATTORNEYS

UNITED STATES PATENT OFFICE.

CHARLES SCOTT, OF PHILADELPHIA, PENNSYLVANIA.

CAR-SPRING.

SPECIFICATION forming part of Letters Patent No. 245,665, dated August 16, 1881.

Application filed April 7, 1881. (No model.)

*To all whom it may concern:*

Be it known that I, CHARLES SCOTT, a citizen of the United States, residing at Philadelphia, in the county of Philadelphia and State of Pennsylvania, have invented certain new and useful Improvements in Metallic Plates or Cases for Bolster or Bearing Springs for Railroad-Cars; and I do hereby declare the following to be a full, clear, and exact description of the invention, reference being had to the accompanying drawings, which form part of this specification, and in which—

Figure 1:
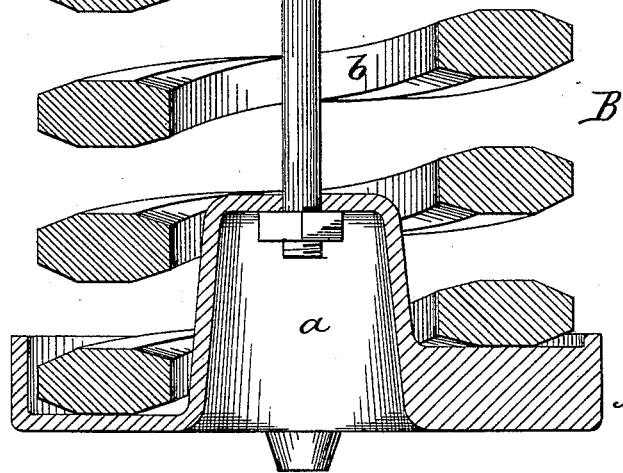
Figure 2:
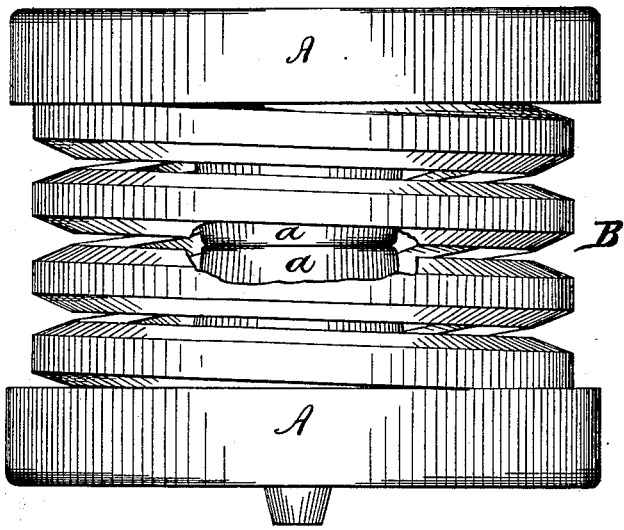

Figure 1 is a vertical section of a bolster-spring and metallic plates constructed in accordance with my improvements; and Fig. 2 is an elevation of the same, the spring being represented as compressed until the bosses on the metallic plates have come together.

My invention has for its object to provide a positive remedy for the large percentage of breakage in car-springs.

Experience has demonstrated that when a spring is made of a capacity sufficient to carry the ordinary load of a car, and to vibrate softly while the car is in motion, it will not withstand the strain to which it is subjected by being violently and suddenly compressed until its coils are wholly closed, or until it becomes "solid," as occurs from overloading or from rough or uneven rail-joints or road-beds. When, therefore, such strain occurs springs will break.

To overcome this difficulty, and to avoid the danger to the springs from overloading and sudden or violent compression, are the purpose of my improvement.

My invention consists in forming the metallic bearing plates or cases, such as are ordinarily used to inclose a spring or springs for railroad-cars, with bosses or projections of such length as to meet when the spring is partly compressed and before it is entirely closed, said stops being so located as to fit in the spring-hole, thus forming steadying-pins as well as stops for said spring.

Referring to the accompanying drawings, A A indicate the bearing or spring plates, between which a spiral car-spring, B, is located. Said plates are formed with inwardly-projecting bosses *a a*, of such length that they will meet within the limits of the range of motion of the spring or come together when the spring is partly compressed and before it becomes wholly closed or solid, thereby preventing such spring from being subjected to the severe shock or strain which ordinarily occurs when a car is overloaded and running at high speed over rough or uneven rails or places on the roadway. The distance between the ends of the opposing stops will depend upon the range of motion of the spring. If, for example, the spring have, say, one and three-fourths inch range, the ends of the stops, when the spring is open or normal, should be only, say, one and a half inch apart. The bosses *a a* are so located as to fit in the hole *b* of the spring, forming steadying-pins for the latter as well as stops, and preventing lateral motion or sliding of the spring between the plates or ends A A.

This improvement is applicable, obviously, to spring boxes or cases, as well as to bearing-plates, the stops being formed on the top and bottom or follower of such cases or boxes, in the same manner as on the plates.

When the plates or cases are made of cast-iron the stops can be formed integral therewith; if made of wrought-iron, the stops can be formed separately therefrom and placed inside the spring.

What I claim as my invention is—

1. Metallic spring plates or cases for car-springs, provided with stops for limiting the compression of the spring, said stops being arranged to fit in the spring-hole, substantially as and for the purpose described.

2. The combination, with a spiral spring, B, of plates or ends A A, having bosses *a a* which fit in the spring-hole *b* and form steadying-pins for the spring, said bosses being of such length that they will meet within the limits of the range of motion of said spring and operate as stops for preventing the latter from closing or becoming solid, substantially as shown and set forth.

In testimony that I claim the foregoing I have hereunto set my hand this 6th day of April, 1881.

CHAS. SCOTT.

Witnesses:
WALTER S. GIBSON,
M. D. CONNOLLY.